US006817519B2

(12) United States Patent
Yasushi et al.

(10) Patent No.: US 6,817,519 B2
(45) Date of Patent: Nov. 16, 2004

(54) USER AUTHENTICATION SYSTEM AND USER AUTHENTICATION METHOD

(75) Inventors: Mitsuo Yasushi, Tsurugashima (JP); Masatoshi Yanagidaira, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 58 days.

(21) Appl. No.: 09/947,921

(22) Filed: Sep. 7, 2001

(65) Prior Publication Data

US 2002/0049915 A1 Apr. 25, 2002

(30) Foreign Application Priority Data

Sep. 8, 2000  (JP) ...................................... 2000-272973

(51) Int. Cl.[7] .............................................. G06F 17/60
(52) U.S. Cl. ...................... 235/379; 235/382; 709/225; 709/228
(58) Field of Search ................................. 235/379, 380, 235/382, 382.5; 709/203, 205, 218, 219, 222, 225, 228

(56) References Cited

U.S. PATENT DOCUMENTS

| 5,898,780 | A | * | 4/1999 | Liu et al. ....................... 380/25 |
| 6,233,608 | B1 | * | 5/2001 | Laursen et al. ............. 709/217 |
| 6,263,432 | B1 | * | 7/2001 | Sasmazel et al. ........... 713/100 |
| 6,425,011 | B1 | * | 7/2002 | Otami et al. ................. 709/225 |
| 6,502,747 | B1 | * | 1/2003 | Stoutenburg et al. ....... 235/379 |

FOREIGN PATENT DOCUMENTS

| EP | 0558326 A1 | 9/1993 |
| WO | WO 00/25475 | 5/2000 |
| WO | WO 00/44149 | 7/2000 |

* cited by examiner

Primary Examiner—Daniel St. Cyr
(74) Attorney, Agent, or Firm—Sughrue Mion, PLLC

(57) ABSTRACT

A user authentication system and a user authenticating method, in which an access from a terminal apparatus to a server by an illegal user other than a specific user can be certainly eliminated by a relatively simple construction using a first terminal apparatus for connecting to an information server through a network line and a second terminal apparatus for connecting to the information server by a communication line independent of the network line.

19 Claims, 6 Drawing Sheets

USER AUTHENTICATION SYSTEM AND USER AUTHENTICATION METHOD

BACKGROUND OF THE INVENTION

1. Field of the Invention

The invention relates to a user authentication system and a user authenticating method for a server.

2. Description of the Related Arts

When a server connected to a network line such as the Internet is accessed from a terminal apparatus as a client in order to obtain information, in many cases, a user authentication is performed in the server in order to exclude the use by unspecific users. In the user authentication, a user ID code and a password which have been predetermined have ordinarily been stored every specific user. When the server receives an access, whether a user ID code and a password which were input to the terminal apparatus coincide with the predetermined user ID code and password or not is discriminated. If the user authentication is completed without problem for accessing from the terminal apparatus by a specific user, the server permits the terminal apparatus to extract the information.

In the network line such as the Internet which can be used by an unspecific user through a terminal apparatus, however, if security of the server is imperfect, there is a possibility that an illegal user other than the specific user accesses easily. Particularly, in the case of the server owned by an individual, since sufficient costs for security cannot be spent, a relatively simple and reliable user authentication is needed.

SUMMARY OF THE INVENTION

It is, therefore, an object of the invention to provide a user authentication system and a user authenticating method in which an access from a terminal apparatus to a server by an illegal user other than a specific user can be certainly excluded by a relatively simple construction.

According to the present invention, there is provided a user authentication system having a first terminal apparatus for connecting to an information server through a network line, a second terminal apparatus for connecting to the information server by a communication line independent of the network line, and an authentication server located on the network line, for authenticating a user of the first terminal apparatus when the information server is accessed from the first terminal apparatus through the network line, comprising: first transmitting means for transmitting a new-issuing request of a password from the second terminal apparatus to the information server through the communication line; password forming means for forming a new password in the information server in response to the new-issuing request of the password from the first transmitting means; second transmitting means for transmitting the password formed by the password forming means to the second terminal apparatus through the communication line; third transmitting means for transmitting the password formed by the password forming means to an authentication server through the network line; reception notifying means for receiving the password transmitted by the second transmitting means in the second terminal apparatus and notifying the received password; input means for accepting a password from the user in the first terminal apparatus; fourth transmitting means for transmitting the password accepted by the input means to the authentication server through the network line; and authenticating means for performing the user authentication in the authentication server in accordance with a coincidence of at least the password transmitted by the third transmitting means and the password transmitted by the fourth transmitting means.

According to the present invention, there is provided a user authenticating method in a network system having a first terminal apparatus for connecting to an information server through a network line, a second terminal apparatus for connecting to the information server by a communication line independent of the network line, and an authentication server located on the network line, for authenticating a user of the first terminal apparatus when the information server is accessed from the first terminal apparatus through the network line, the method comprises the steps of: transmitting a new-issuing request of a password from the second terminal apparatus to the information server through the communication line; forming a new password in the information server in response to the new-issuing request of the password; transmitting the password formed in the information server to the second terminal apparatus through the communication line; transmitting the password formed in the information server to the authentication server through the network line; receiving the password transmitted from the information server in the second terminal apparatus and notifying the received password; accepting a password from the user in the first terminal apparatus and transmitting the accepted password to the authentication server through the network line; and performing the user authentication in the authentication server in accordance with a coincidence of at least the password transmitted from the information server and the password transmitted from the first terminal apparatus.

According to the present invention, there is provided an information server for connecting to a first terminal apparatus through a network line, and for connecting to a second terminal apparatus by a communication line independent of the network line, and for receiving an access from the first terminal apparatus through the network line, comprising: password forming means for forming a new password in response to a new-password issuing request transmitted from the second terminal apparatus through the communication line before the information server is accessed from the first terminal apparatus via the network line; first transmitting means for transmitting the password formed by the password forming means to the second terminal apparatus through the communication line; and second transmitting means for transmitting the password formed by the password forming means through the network line to an authentication server for performing an authentication with respect to a user of the first terminal apparatus after the password is transmitted by the first transmitting means.

According to the present invention, there is provided an authentication server located on a network line in a network system having a first terminal apparatus for connecting to an information server through the network line and a second terminal apparatus for connecting to the information server by a communication line independent of the network line, for authenticating a user of the first terminal apparatus when the information server is accessed from the first terminal apparatus through the network line, comprises: first receiving means for receiving a new password transmitted from the information server through the network line; second receiving means for receiving a password transmitted from the first terminal apparatus through the network line; authenticating means for performing the user authentication in accordance with a coincidence of the password received by the first receiving means and the password received by the second receiving means; and means for guiding an access destination of the first terminal apparatus to the information server when the user authentication by the authenticating means is completed.

According to the present invention, there is provided a user authentication system having a first terminal apparatus for connecting to an information server through a network line, a second terminal apparatus for connecting to the information server by a communication line independent of the network line, and an authentication server located on the network line, for authenticating a user of the first terminal apparatus an when the information server is accessed from the first terminal apparatus through the network line, comprising: password forming means for forming a new password in the second terminal apparatus and notifying the new password; first transmitting means for transmitting the password formed by the password forming means to the information server through the communication line; transmitting and receiving means for receiving the password transmitted from the first transmitting means in the information server and, thereafter, transmitting the received password to the authentication server through the network line; input means for accepting a password from the user in the first terminal apparatus; second transmitting means for transmitting the password accepted by the input means to the authentication server through the network line; and authenticating means for performing the user authentication in the authentication server in accordance with a coincidence of at least the password transmitted by the transmitting and receiving means and the password transmitted by the second transmitting means.

According to the present invention, there is provided a user authenticating method in a network system having a first terminal apparatus for connecting to an information server through a network line and a second terminal apparatus for connecting to the information server by a communication line independent of the network line, in which an authentication server located on the network line authenticates a user of the first terminal apparatus when the information server is accessed from the first terminal apparatus through the network line, the method comprises the steps of: forming a new password by the second terminal apparatus and notifying the new password; transmitting the password formed by the second terminal apparatus to the information server from the second terminal apparatus through the communication line; receiving the password transmitted from the second terminal apparatus in the information server and, thereafter, transmitting the received password to the authentication server through the network line; accepting a password from the user in the first terminal apparatus; transmitting the password accepted in the first terminal apparatus to the authentication server through the network line; and performing the user authentication in the authentication server in accordance with a coincidence of at least the password transmitted from the information server and the password transmitted from the first terminal apparatus.

According to the present invention, there is provided an information server for connecting to a first terminal apparatus through a network line, for connecting to a second terminal apparatus by a communication line independent of the network line, and for being accessed from the first terminal apparatus through the network line, comprising: receiving means for receiving a new password transmitted from the second terminal apparatus through the communication line before the information server is accessed from the first terminal apparatus via the network line; first transmitting means for transmitting the password received by the second receiving means to the second terminal apparatus through the communication line; and second transmitting means for transmitting the password formed by password forming means through the network line to an authentication server for authenticating a user of the first terminal apparatus after the password is transmitted by the first transmitting means.

According to the present invention, there is provided an authentication server located on a network line in a network system having a first terminal apparatus for connecting to an information server through the network line and a second terminal apparatus for connecting to the information server by a communication line independent of the network line, for authenticating a user of the first terminal apparatus when the information server is accessed from the first terminal apparatus through the network line, comprises: first receiving means for receiving a new password transmitted from the second terminal apparatus through the information server and the network line; second receiving means for receiving a password transmitted from the first terminal apparatus through the network line; authenticating means for performing the user authentication in accordance with a coincidence of the password received by the first receiving means and the password received by the second receiving means; and means for guiding a destination accessed by the first terminal apparatus to the information server when the user authentication by the authenticating means is completed.

According to the present invention, there is provided a user authentication system having a first terminal apparatus for connecting to an information server through a network line, a second terminal apparatus for connecting to the information server by a communication line independent of the network line and an authentication server located on the network line, for authenticating a user of the first terminal apparatus when the information server is accessed from the first terminal apparatus through the network line, comprising: first transmitting means for transmitting a new-issuing request of a password in the first terminal apparatus to the authentication server through the network line; password forming means for forming a new password in the authentication server in response to the new-issuing request of the password from the first transmitting means; second transmitting means for transmitting the password formed by the password forming means to the first terminal apparatus through the network line; reception notifying means for receiving the password transmitted by the second transmitting means, in the first terminal apparatus and notifying it; input means for accepting a password from the user in the second terminal apparatus; third transmitting means for transmitting the password accepted by the input means to the information server through the communication line; transmitting and receiving means for receiving the password transmitted from the third transmitting means in the information server and, thereafter, transmitting the received password to the authentication server through the network line; and authenticating means for performing the user authentication in the authentication server in accordance with a coincidence of at least the password transmitted by the third transmitting means and the password formed by the password forming means.

According to the present invention, there is provided a user authenticating method in a network system having a first terminal apparatus for connecting to an information server through a network line and a second terminal apparatus for connecting to the information server by a communication line independent of the network line, and an authentication server located on the network line, for authenticating a user of the first terminal apparatus when the information server is accessed from the first terminal apparatus through the network line, the method comprises the steps of: transmitting a new-issuing request of a password from the first terminal apparatus to the authentication server through the network line; forming a new password in the authentication server in response to the new-issuing request of the password from the first terminal apparatus; transmitting the password formed in the authentication server to the first terminal apparatus through the network line; receiving the password transmitted from the authentication server in the first terminal apparatus and notifying the received password; accepting a password from the user in the second terminal apparatus; transmitting the password accepted in the second terminal apparatus to the information server through the communication line; receiving the password transmitted from the second terminal apparatus in the information server and, thereafter, transmitting the received password to the authentication server through the network line; and performing the user authentication in the authentication server in accordance with a coincidence of at least the password transmitted from the information server and the formed password.

According to the present invention, there is provided an authentication server located on a network line in a network system having a first terminal apparatus for connecting to an information server through the network line and a second terminal apparatus for connecting to the information server by a communication line independent of the network line, for authenticating a user of the first terminal apparatus when the information server is accessed from the first terminal apparatus through the network line, comprises: password forming means for forming a new password in response to a new-password issuing request transmitted from the first terminal apparatus through the network line before the information server is accessed from the first terminal apparatus through the network line; first transmitting means for transmitting the password formed by the password forming means to the first terminal apparatus through the network line; receiving means for receiving the password transmitted from the second terminal apparatus through the information server and the network line; authenticating means for performing the user authentication in accordance with a coincidence of the password received by the receiving means and the password formed by the password forming means; and means for guiding a destination accessed by the first terminal apparatus to the information server when the user authentication by the authenticating means is completed.

According to the present invention, there is provided a user authentication system having a first terminal apparatus for connecting to an information server through a network line, a second terminal apparatus for connecting to the information server by a communication line independent of the network line, and an authentication server located on the network line, for authenticating a user of the first terminal apparatus when the information server is accessed from the first terminal apparatus through the network line, comprising: password forming means for forming a new password by the first terminal apparatus and notifying the new password; first transmitting means for transmitting the password formed by the password forming means to the authentication server through the network line; input means for accepting a password from the user in the second terminal apparatus; second transmitting means for transmitting the password accepted by the input means to the information server through the communication line; transmitting and receiving means for receiving the password transmitted from the first transmitting means in the information server and, thereafter, transmitting the received password to the authentication server through the network line; and authenticating means for performing the user authentication in the authentication server in accordance with a coincidence of at least the password transmitted by the transmitting and receiving means and the password transmitted by the second transmitting means.

According to the present invention, there is provided a user authenticating method in a network system having a first terminal apparatus for connecting to an information server through a network line and a second terminal apparatus for connecting to the information server by a communication line independent of the network line, in which an authentication server located on the network line authenticates a user of the first terminal apparatus when the information server is accessed from the first terminal apparatus through the network line, the method comprises the steps of: forming a new password in the first terminal apparatus and notifying the new password; transmitting the password formed in the first terminal apparatus to an authentication server through the network line; accepting a password from the user in the second terminal apparatus; transmitting the password received in the second terminal apparatus to the information server through the communication line; receiving the password transmitted from the second terminal apparatus in the information server and, thereafter, transmitting the received password to the authentication server through the network line; and performing the user authentication in the authentication server in accordance with a coincidence of at least the password transmitted from the information server and the password transmitted from the first terminal apparatus.

According to the present invention, there is provided an authentication server located on a network line in a network system having a first terminal apparatus for connecting to an information server through the network line and a second terminal apparatus for connecting to the information server by a communication line independent of the network line, for authenticating a user of the first terminal apparatus when the information server is accessed from the first terminal apparatus through the network line, comprises: first receiving means for receiving a password formed newly and transmitted in the first terminal apparatus through the network line; second receiving means for receiving the password transmitted from the second terminal apparatus through the information server and the network line; authenticating means for performing the user authentication in accordance with a coincidence of the password received by the first receiving means and the password received by the second receiving means; and means for guiding a destination accessed by the first terminal apparatus to the information server when the user authentication by the authenticating means is completed.

DETAILED DESCRIPTION OF THE PREFERRED EMBODIMENTS

Embodiments of the invention will now be described in detail here in below with reference to the drawings.

Figure 1:
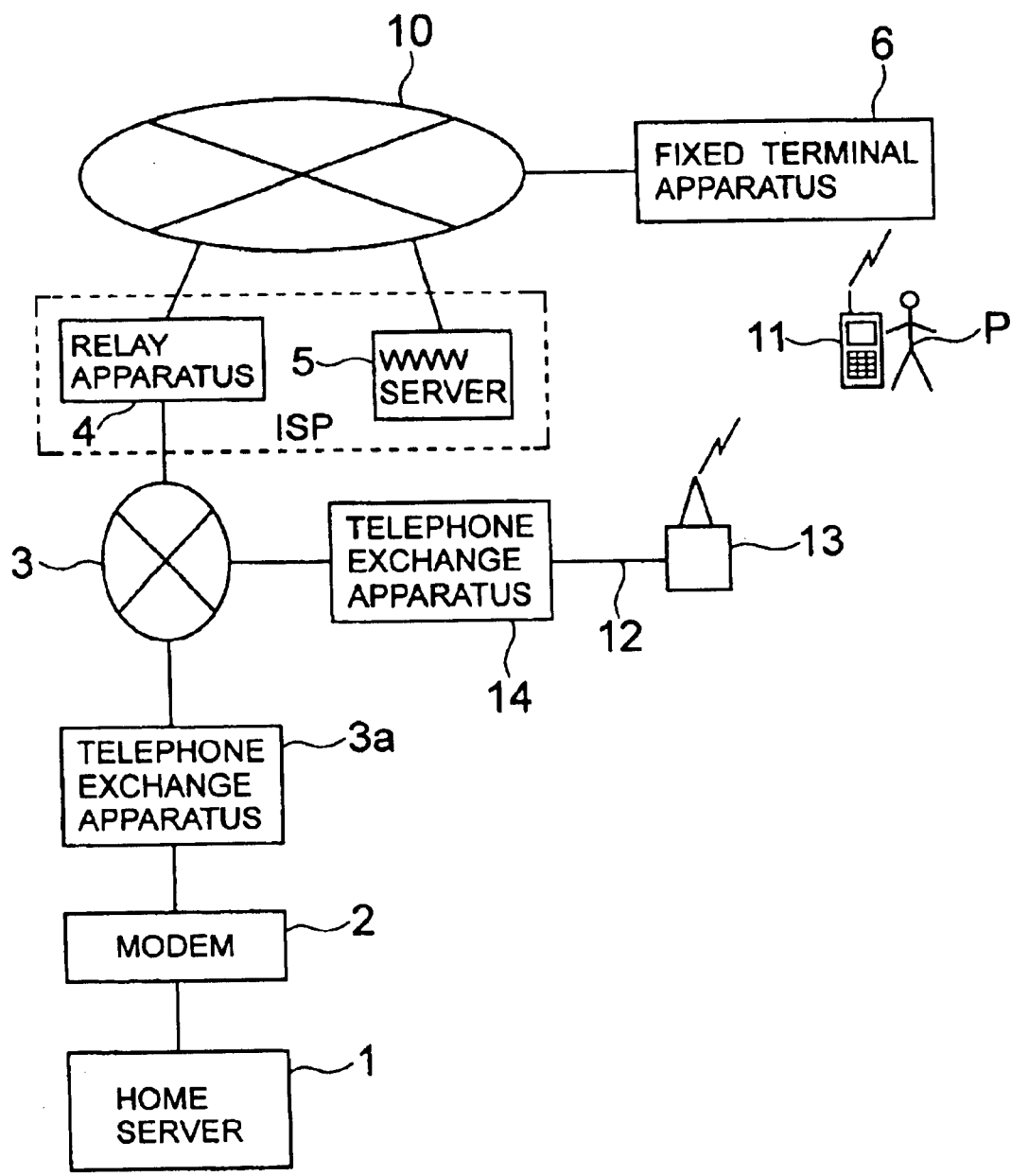
FIG. 1 is a block diagram showing a construction of a user authentication system according to the present invention.

FIG. 1 shows a construction of a network system to which the present invention is applied. The network system includes a house server 1 and a modem 2. The home server 1 is an information server provided in a house of a user P. The modem 2 is a transmitter/receiver for connecting the home server 1 to a public telephone line network 3 and has an automatic reception responding function. A telephone exchange apparatus 3a for connecting a telephone line to the modem 2 is included in the public telephone line network 3.

If an ISDN line has already been drawn into the house of the user P from the telephone exchange apparatus 3a, a terminal adapter is used in place of the modem 2.

A relay apparatus 4 of an ISP (Internet Service Provider) is connected to the public telephone line network 3. The user P has a contract with the ISP and can dial-up connect the home server 1 to the Internet 10 through the modem 2 and relay apparatus 4. That is, the home server 1 is not a server which is always connected to the Internet 10.

Although not shown, a router and a DHCP (Dynamic Host Configuration Protocol) server are included in the relay apparatus 4. When the home server 1 is connected to the Internet 10, the DHCP server allocates a dynamic IP (Internet Protocol) address to the home server 1.

The Internet Service Provider ISP has a WWW (World Wide Web) server 5 including memory areas in each which the use by a contractor is permitted. The user P has display data for forming a Web page held into a memory area which is designated by a predetermined URL (Uniform Resource Locator) of the WWW server 5. The Web page is a page for authenticating a user by an identification code ID and a password entered by requesting an input of the identification code ID and password for accessing the home server in order to permit an access to the home server 1. That is, the WWW server 5 functions as an authentication server.

The network system includes a fixed terminal apparatus 6 which can be operated by the user P and which is connected to the Internet 10. The fixed terminal apparatus 6 has, for example, a personal computer provided in an LAN (Local Area Network) and is connected to the Internet 10 through the router (not shown). The terminal apparatus 6 can be also solely connected to the Internet 10.

The user P has a portable terminal apparatus (hereinafter, referred to as a cellular phone) 11. The user P possesses the cellular phone 11 by making a contract with a cellular phone provider who runs cellular phone business. In the embodiment, although only the cellular phone 11 is shown for simplicity of explanation, the invention is not limited to it but a plurality of cellular phones can be also provided. The cellular phone provider possesses a base station apparatus 13 and a telephone exchange apparatus 14.

The base station apparatus 13 is an apparatus for relaying transmission/reception signals for the cellular phone and data communications and is arranged in a small region called a cell. Although only one base station apparatus 13 is shown in FIG. 1, a number of base station apparatuses exist actually. A plurality of base station apparatuses including the base station apparatus 13 form a network in which they are connected by each dedicated line 12 around the telephone exchange apparatus 14 as a center.

The telephone exchange apparatus 14 is connected to the public telephone line network 3. It is, therefore, possible to access from the cellular phone 11 to the home server 1 through the base station apparatus 13, dedicated line 12, telephone exchange apparatus 14, public telephone line network 3, telephone exchange apparatus 3a, and modem 2.

The telephone exchange apparatus 3a connected to the modem 2 executes an offline process, without placing the modem 2 online, in response to a line connecting request other than a line connecting request to the modem 2 by a specific telephone numbers. Since the telephone number allocated to the cellular phone 11 is included in the specific telephone number, the telephone exchange apparatus 3a connects the line in response to the line connecting request which is issued from the cellular phone 11 and is used for connecting it to the telephone line which reaches the modem 2. It is, consequently, impossible to communicate with the home server 1 from a cellular phone other than predetermined cellular phones through the modem 2. The line connecting request includes at least a telephone number of a transmitting source and a telephone number of a reception destination.

In the construction, in order to allow the user P to access from the fixed terminal apparatus 6 to the home server 1, it is necessary to first obtain a new password through the cellular phone 11. This is because it is intended to prevent an illegal access to the home server 1 in a online state where the home server 1 is connected to the Internet 10.

Subsequently, the operation for allowing the user P to access from the fixed terminal apparatus 6 to the home server 1 will now be described with reference to the operation of each of the home server 1, relay apparatus 4, fixed terminal apparatus 6, and cellular phone 11 shown in FIG. 2.

The user P performs the dialing operation of the cellular phone 11 in order to communicate with the home server 1 from the cellular phone 11, so that the cellular phone 11 executes the line connection requesting operation (step S11). A line connecting request from the cellular phone 11 reaches the modem 2 through the base station apparatus 13, dedicated line 12, telephone exchange apparatus 14, public telephone line network 3, and telephone exchange apparatus 3a (step S12).

Since the modem 2 transmits a reception signal to the home server 1 in response to a call such as the line connecting request by an automatic reception responding function, a line between the cellular phone 11 and home server 1 is communicably established through the base station apparatus 13, dedicated line 12, telephone exchange apparatus 14, public telephone line network 3, telephone exchange apparatus 3a, and modem 2 (step S13). As mentioned above, since the telephone exchange apparatus 3a executes a line connection operation in response to the line connecting request from the cellular phone 11 to the telephone line which reaches the modem 2, communication between the cellular phone 11 and home server 1 can be performed.

A state showing that the communication between the cellular phone 11 and home server 1 is possible becomes a new-issuing request of a password, and the home server 1 forms a new password (step S14) and transmits the formed password to the cellular phone 11 (step S15). In step S14, the password is a password for accessing the home server and is formed, for example, on the basis of random numbers.

The cellular phone 11 displays the password on a display unit upon receiving the password for accessing the home server (step S16).

The home server 1 instructs a line disconnection when a predetermined time elapses after the transmission of the password (step S17). The modem 2 generates a disconnecting request in response to the line disconnecting instruction, so that the line between the cellular phone 11 and home server 1 is disconnected at each of the telephone exchange apparatus 3a, telephone exchange apparatus 14, and base station apparatus 13 (step S18).

The home server 1 further starts the dial-up operation in order to connect to the Internet 10 (step S19), so that the line connecting request is supplied from the home server 1 to the relay apparatus 4 through the modem 2, telephone exchange apparatus 3a, and public telephone line network 3 (step S20).

The relay apparatus 4 executes the user authenticating operation upon receiving the line connecting request (step S21) and permits the connection to the Internet 10 (step S22). In the user authenticating operation, although not shown, an identification code ID and a password for connection to the Internet 10 are received from the home server 1 and whether they coincide with an identification code ID and a password which have previously been registered or not is discriminated. If they coincide, step S22 is executed. In the case of permitting the connection to the Internet 10 from the home server 1, the relay apparatus 4 executes the connecting process (step S23).

The home server 1 discriminates whether it has been connected to the Internet 10 or not (step S24). If it is connected to the Internet 10, an allocated IP address is obtained from the DHCP server (step S25).

The home server 1 accesses the WWW server 5, thereby allowing a communicating state to be established (step S26). The home server 1 instructs to update password data for accessing the home server in a memory area designated by a predetermined URL (step S27), and instructs to update access destination data to the home server 1 (step S28). The password data in step S27 is data showing the password formed in step S14. The access destination data is the IP address obtained in step S25.

The WWW server 5 rewrites the password data and access destination data in the memory area designated by the predetermined URL in response to the instructions (step S29).

The user P executes the operation for accessing the WWW server 5 in order to access the home server 1 by using the fixed terminal apparatus 6. Since the terminal apparatus 6 is always connected to the Internet 10, the fixed terminal apparatus 6 accesses the WWW server 5 in accordance with the operation of the user P, thereby allowing a communicating state to be established (step S30).

When the communicating state with the fixed terminal apparatus 6 is established, the WWW server 5 transmits display data in the memory area designated by the predetermined URL to the fixed terminal apparatus 6 (step S31). The display data is data to form a Web page for requesting the input of the identification code ID and password for accessing the home server in order to permit the access to the home server 1.

When the fixed terminal apparatus 6 receives the display data, the Web page for inputting is displayed on a browser screen of a display (not shown) (step S32). By watching the Web page, the user P inputs the identification code ID and password for accessing the home server by pressing keys. The password to be input here is a new password displayed on the display unit of the cellular phone 11.

The fixed terminal apparatus 6 accepts the input identification code ID and password (step S33) and transmits the input identification code ID and password to the WWW server 5 (step S34).

The WWW server 5 executes the authenticating operation with respect to the identification code ID and password upon receiving the identification code ID and password (step S35). In the authenticating operation, whether the received identification code ID and password coincide with each data of the identification code ID and password in the memory area or not is discriminated. When the authenticating operation is completed by coinciding the received identification code ID and password with them, the WWW server 5 instructs the fixed terminal apparatus 6 to change an access destination for the home server 1 (step S36). The access destination is obtained from access destination data in the memory area which was updated in step S29 and designated by the predetermined URL.

When the access destination change instruction is received in the fixed terminal apparatus 6, the fixed terminal apparatus 6 accesses the IP address of the home server 1 shown by the access destination change instruction, thereby allowing the communicating state to be established (step S37).

The fixed terminal apparatus 6 and home server 1, consequently, enter the communicating state through the Internet 10, relay apparatus 4, public telephone line network 3, telephone exchange apparatus 3a, and modem 2, and mutually execute the transmission and reception in accordance with a predetermined protocol, so that the data in the home server 1 is supplied to the fixed terminal apparatus 6 (step S38).

When the use of the home server 1 is finished, the user P executes the operation to finish the access for the fixed terminal apparatus 6, and the fixed terminal apparatus 6 finishes the communication with the home server 1 in accordance with the finishing operation (step S39). The home server 1 instructs the relay apparatus 4 to disconnect from the Internet (step S40). In response to a disconnecting instruction, the relay apparatus 4 disconnects the line connecting the home server 1 and Internet 10 (step S41) If there is no access for a predetermined time, the home server 1 can also automatically issues the Internet disconnecting instruction to the relay apparatus 4. It is also possible to construct in a manner such that the fixed terminal apparatus 6 transmits a notification indicative of the end of the access and, when the notification is received, the home server 1 issues the Internet disconnecting instruction to the relay apparatus 4.

Although the home server 1 newly forms the password for accessing the home server in the embodiment, the cellular phone 11 can also newly form the password for accessing the home server.

Figure 3:
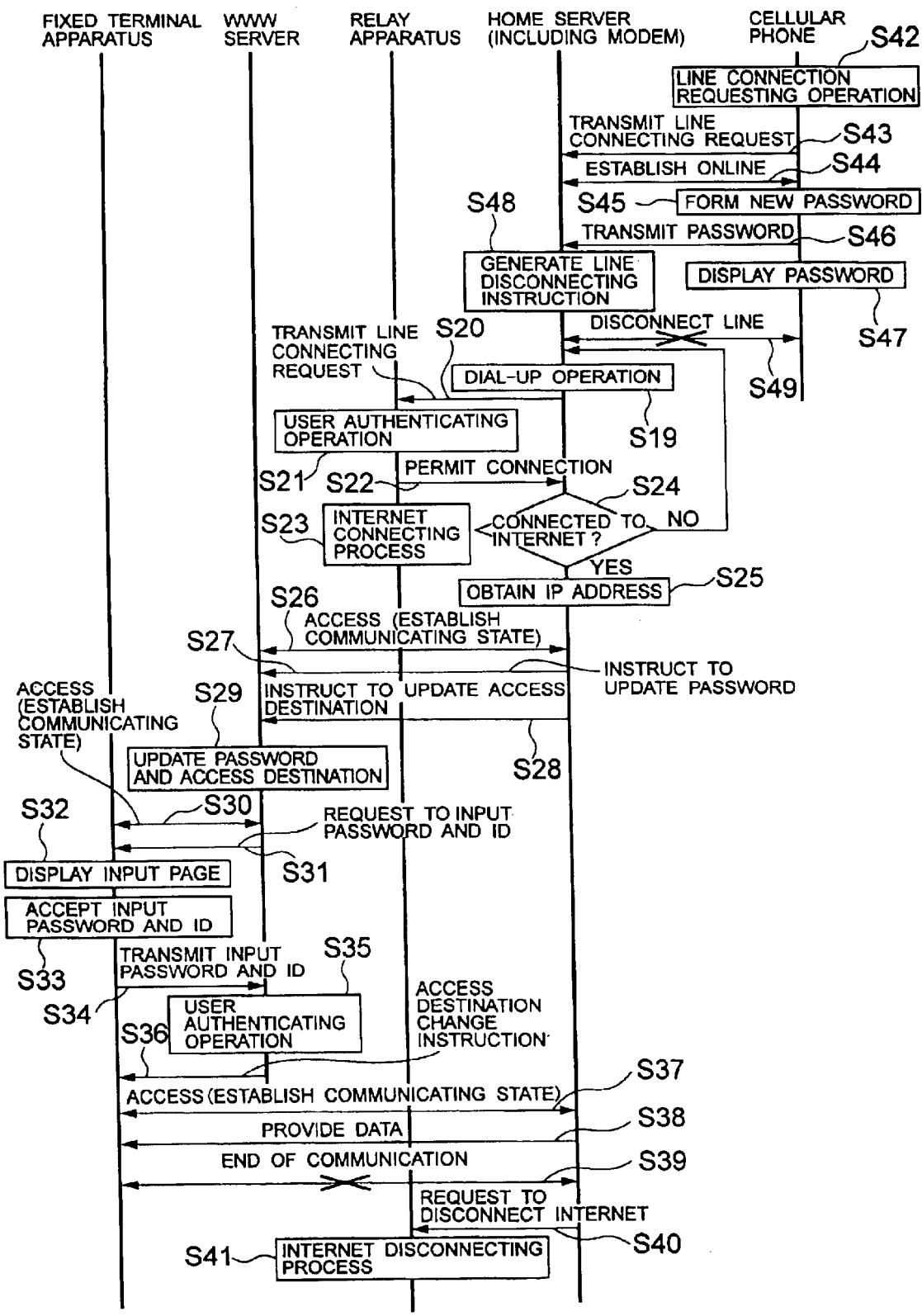
FIG. 3 is a sequence diagram showing the operation of the user authentication system in FIG. 1.

The operation which is executed in the case where the cellular phone 11 newly forms the password for accessing the home server and the user P accesses the home server 1 from the fixed terminal apparatus 6 will now be described with reference to a sequence diagram of FIG. 3.

The user P executes the dialing operation of the cellular phone 11 in order to communicate with the home server 1 from the cellular phone 11, so that the cellular phone 11 executes the line connection requesting operation (step S42). The line connecting request from the cellular phone 11 reaches the modem 2 through the base station apparatus 13, dedicated line 12, telephone exchange apparatus 14, public telephone line network 3, and telephone exchange apparatus 3a (step S43).

Since the modem 2 transmits a reception signal to the home server 1 in response to the call by the automatic reception responding function, the line between the cellular phone 11 and home server 1 is established through the base station apparatus 13, dedicated line 12, telephone exchange apparatus 14, public telephone line network 3, telephone exchange apparatus 3*a*, and modem 2 (step S44).

Steps S42 to S44 are substantially the same as steps S11 to S13 mentioned above.

The cellular phone 11 forms a new password for accessing the home server after the establishment of the line (step S45) and transmits the formed password to the home server 1 (step S46). The cellular phone 11 also allows the password for accessing the home server to be displayed onto the display unit (step S47). The user P is, thus, allowed to know the password for accessing the home server.

Upon receiving the password for accessing the home server, the home server 1 instructs to disconnect the line (step S48). The modem 2 generates a disconnecting request in response to the line disconnecting instruction, so that the line between the cellular phone 11 and home server 1 is disconnected at each of the telephone exchange apparatus 3*a*, telephone exchange apparatus 14, and base station apparatus 13 (step S49).

Figure 2:
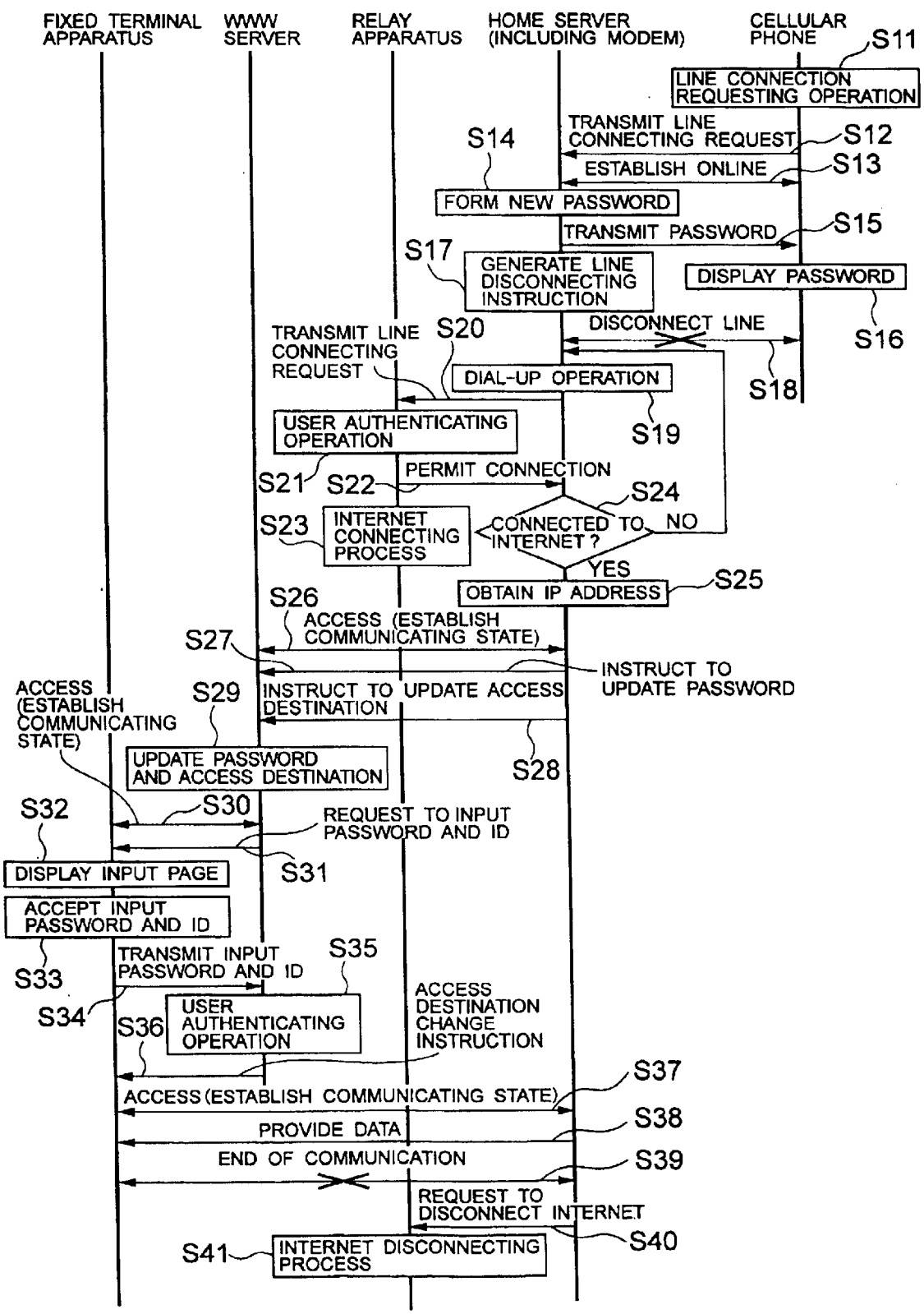
FIG. 2 is a sequence diagram showing the operation of the user authentication system in FIG. 1.

Since the subsequent operations are substantially the same as those in steps S19 to S41 shown in FIG. 2, their overlapped description is omitted here. On the inputting Web page displayed on the browser screen of the display (not shown) of the fixed terminal apparatus 6 in step S32, the user P inputs the identification code ID and password for accessing the home server. The password to be input, however, is the password displayed on the display unit of the cellular phone 11 in step S47.

The invention is not limited to the example in which the home server 1 and cellular phone 11 do not newly form the password for accessing the home server but the WWW server 5 can also newly form the password for accessing the home server.

Figure 4:
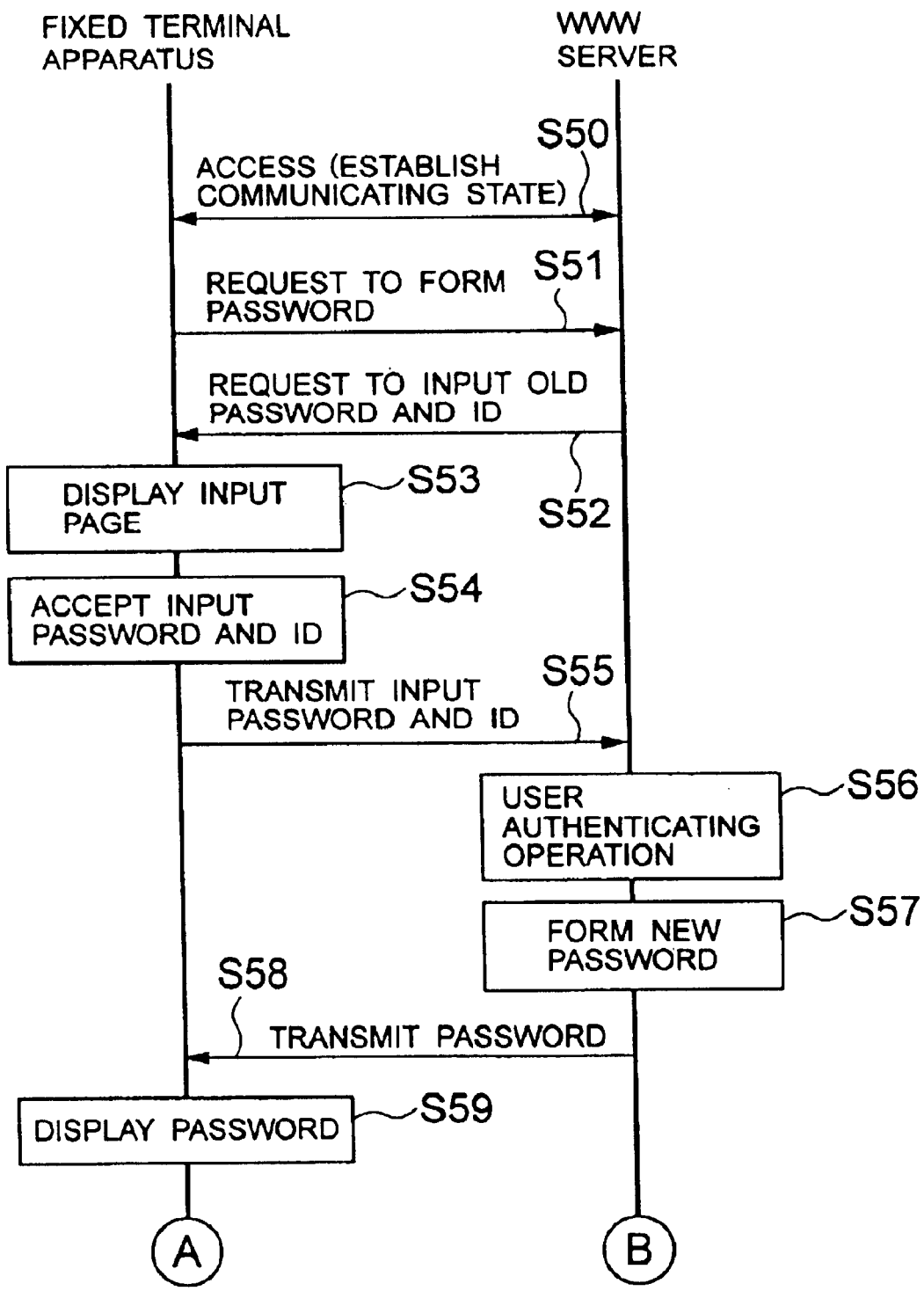
FIG. 4 is a sequence diagram showing the operation of the user authentication system in FIG. 1.

The operation which is executed in the case where the WWW server 5 can also newly form the password for accessing the home server and the user P accesses from the fixed terminal apparatus 6 to the home server 1 will now be described with reference to sequence diagrams of FIGS. 4 and 5.

The fixed terminal apparatus 6 accesses the WWW server 5 in accordance with the operation by the user P, thereby allowing the communicating state to be established (step S50) and transmits a password forming request to the WWW server 5 (step S51). Since the fixed terminal apparatus 6 is always connected to the Internet 10, after the communicating state between the fixed terminal apparatus 6 and WWW server 5 is established, the password forming request is supplied from the fixed terminal apparatus 6 to the WWW server 5 through the Internet 10.

The WWW server 5 transmits the display data for forming the inputting Web page for requesting the input of the identification code ID and the old password in response to the password forming request from the fixed terminal apparatus 6 (step S52).

When the fixed terminal apparatus 6 receives the display data, the Web page is displayed on the browser screen of the display (step S53). On this Web page, the user P inputs the identification code ID for accessing the home server and the old password.

The fixed terminal apparatus 6 accepts the input identification code ID and old password (step S54) and transmits the input identification code ID and old password to the WWW server 5 (step S55).

When the identification code ID and the old password are received in the WWW server 5, the WWW server 5 executes the authenticating operation with respect to the identification code ID and the old password (step S56). In this authenticating operation, whether the received identification code ID and old password coincide with each data of the identification code ID and the password in the memory area designated by the predetermined URL or not is discriminated. When the authenticating operation is completed by coinciding the identification code ID and the password with those in the memory area, the WWW server 5 forms a new password for accessing the home server (step S57) and transmits the formed password to the fixed terminal apparatus 6 (step S58). When the identification code ID and the password do not coincide with those in the memory area, the WWW server 5 can also request the fixed terminal apparatus 6 to input the identification code ID and the old password again although not shown.

The fixed terminal apparatus 6 allows the password for accessing the home server to be displayed on the browser screen of the display (step S59). The user P, consequently, is allowed to know the password for accessing the home server.

The user executes the dialing operation of the cellular phone 11 in order to communicate with the home server 1 from the cellular phone 11, so that the cellular phone 11 executes the line connection requesting operation (step S60). The line connecting request from the cellular phone 11 reaches the modem 2 through the base station apparatus 13, dedicated line 12, telephone exchange apparatus 14, public telephone line network 3, and telephone exchange apparatus 3*a* (step S61).

Since the modem 2 transmits the reception signal to the home server 1 in response to the call by the automatic reception responding function, the line between the cellular phone 11 and home server 1 is established through the base station apparatus 13, dedicated line 12, telephone exchange apparatus 14, public telephone line network 3, telephone exchange apparatus 3*a*, and modem 2 (step S62).

Steps S60 to S62 are substantially the same as steps S11 to S13 mentioned above.

In the cellular phone 11, the input picture plane of the password is displayed on the display unit after the establishment of the line (step S63). The user P, consequently, inputs the new password for accessing the home server obtained by the display in step S59 by operating the operation unit of the cellular phone 11. The cellular phone 11 accepts the password from the operation unit input by the user P (step S64) and transmits the accepted password to the home server 1 (step S65).

The home server 1 instructs the disconnection of the line when receiving the password for accessing the home server (step S66). The modem 2 generates the disconnecting request in response to the line disconnecting instruction, so that the line between the cellular phone 11 and home server 1 is disconnected at each of the telephone exchange apparatus 3*a*, telephone exchange apparatus 14, and base station apparatus 13 (step S67).

The home server 1 further starts the dial-up operation to connect to the Internet 10 (step S68), so that the line connecting request is supplied to the relay apparatus 4 through the modem 2, telephone exchange apparatus 3*a*, and public telephone line network 3 (step S69).

The relay apparatus 4 executes the user authenticating operation when receiving the line connecting request (step S70) and, thereafter, permits the connection to the Internet 10 (step S71). In the case of permitting the connection to the Internet 10 from the home server 1, the relay apparatus 4 executes the connecting process (step S73).

The home server 1 discriminates whether it has been connected to the Internet 10 or not (step S72). If it has been connected to the Internet 10, the allocated IP address is obtained from the DHCP server (step S74).

The home server 1 accesses the WWW server 5, thereby allowing the communicating state to be established (step S75), instructs to update the password data for accessing the home server in the memory area designated by the predetermined URL (step S76), and instructs the home server 1 to update the access destination data (step S77). The password data whose updating is instructed in step S76 is the data indicative of the password accepted by the cellular phone 11 in step S64 by the inputting operation by the user P. The access destination data is the IP address obtained in step S74.

The WWW server 5 discriminates whether the password formed in step S57 and the password obtained by the updating instruction in step S76 coincide or not (step S78).

When both passwords coincide, the password data and the access destination data in the memory area designated by the predetermined URL are updated (step S79).

The user P tries to access the WWW server 5 in order to access the home server 1 by using the fixed terminal apparatus 6. Since the fixed terminal apparatus 6 is always connected to the Internet 10, the fixed terminal apparatus 6 accesses the WWW server 5 in accordance with the operation of the user P, thereby allowing a communicating state to be established (step S80). In the case of maintaining the communicating state of step S59, step S80 is unnecessary.

Since the operations in step S80 and subsequent steps are substantially the same as those in steps S31 to S41, their overlapped description is omitted here.

Since the user identification code ID is authenticated in step S56, only the password is authenticated in step S78. It is, however, possible to transmit the new password and identification code ID from the fixed terminal apparatus 6 and authenticate both of the password and identification code ID before step S78.

Figure 6:
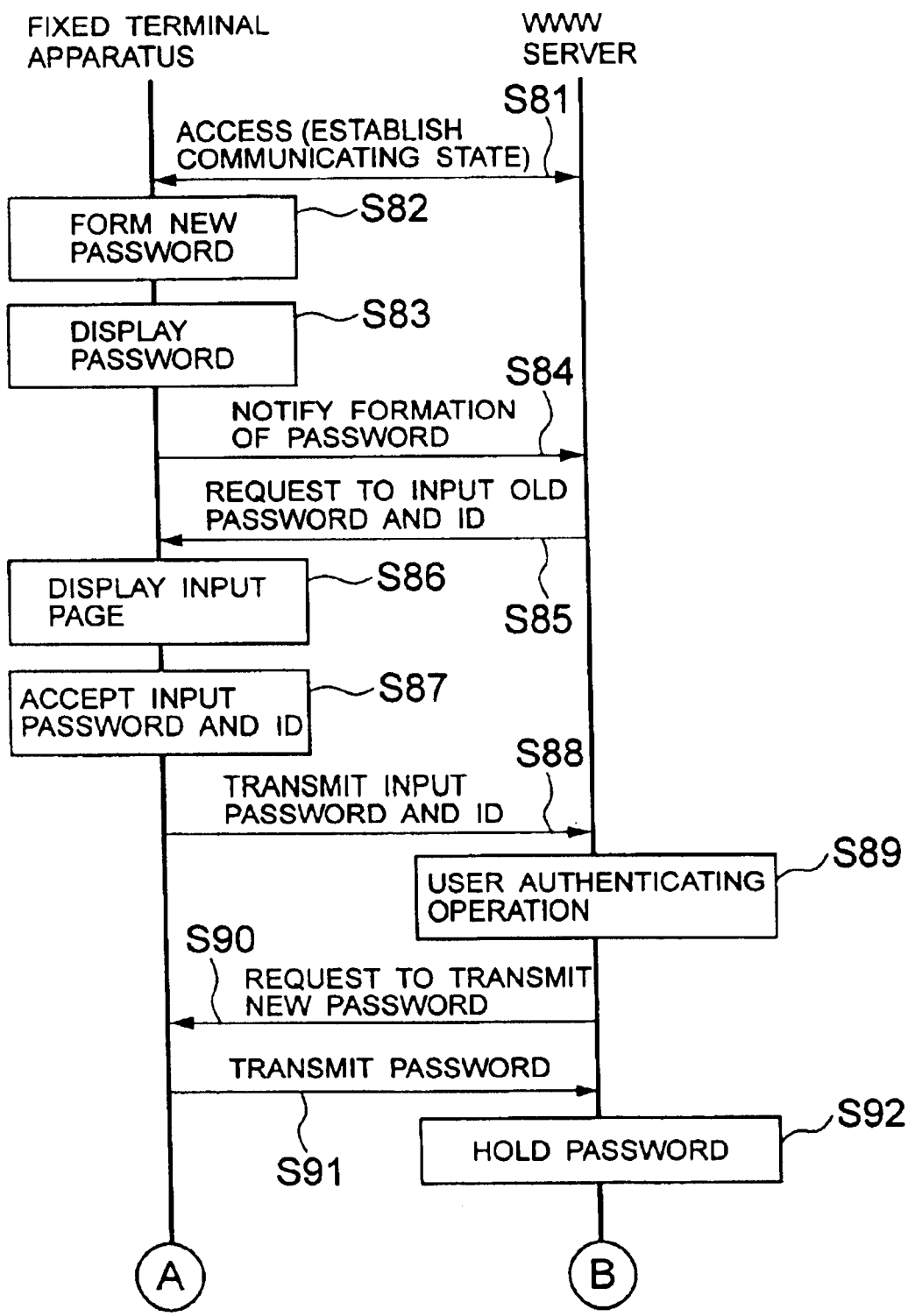
FIG. 6 is a sequence diagram showing the operation of the user authentication system in FIG. 1.

The operation which is executed in the case where the fixed terminal apparatus 6 newly forms the password for accessing the home server and the user P accesses the home server 1 from the fixed terminal apparatus 6 will now be described with reference to a sequence diagram of FIG. 6.

The fixed terminal apparatus 6 accesses the WWW server 5 in accordance with the operation by the user P, thereby allowing the communicating state to be established (step S81), forms a password for accessing the home server in accordance with the operation by the user P (step S82), and allows the password to be displayed on the display (step S83). When step S82 is executed, a predetermined program is executed, for example, a password forming button for accessing the home server is displayed on the browser screen of the display, and the password for accessing the home server is formed by clicking the password forming button by operating a mouse pointer. By the display in step S83, the user P is allowed to know the new password for accessing the home server.

After the execution of step S83, the fixed terminal apparatus 6 generates a new password forming notification to the WWW server 5 (step S84).

In response to the new password forming notification from the fixed terminal apparatus 6, the WWW server 5 transmits the display data for forming the inputting Web page for requesting the input of the identification code ID and the old password (step S85).

When the fixed terminal apparatus 6 receives the display data, the inputting Web page is displayed on the browser screen of the display (step S86). On this Web page, the user P inputs the identification code ID for accessing the home server and the old password.

The fixed terminal apparatus 6 accepts the input identification code ID and the old password (step S87) and transmits the identification code ID and the old password to the WWW server 5 (step S88).

When the WWW server 5 receives the identification code ID and the old password, the WWW server 5 executes the authenticating operation with respect to the identification code ID and the old password (step S89). In this authenticating operation, whether the received identification code ID and old password coincide with each data of the identification code ID and the word password in the memory area designated by the predetermined URL or not is discriminated. When the authenticating operation is completed by coinciding the identification code ID and the password with those in the memory, the WWW server 5 requests the fixed terminal apparatus 6 to transmit the new password for accessing the home server (step S90).

The fixed terminal apparatus 6 transmits the new password data showing the password formed in step S82 to the WWW server 5 in response to the new password transmitting request (step S91). The fixed terminal apparatus 6 can also execute the formation and display of the new password in steps S82 and S83 just after the transmitting request of the new password is received.

When the new password data is received in the WWW server 5, the WWW server 5 holds it (step S92).

Figure 5:
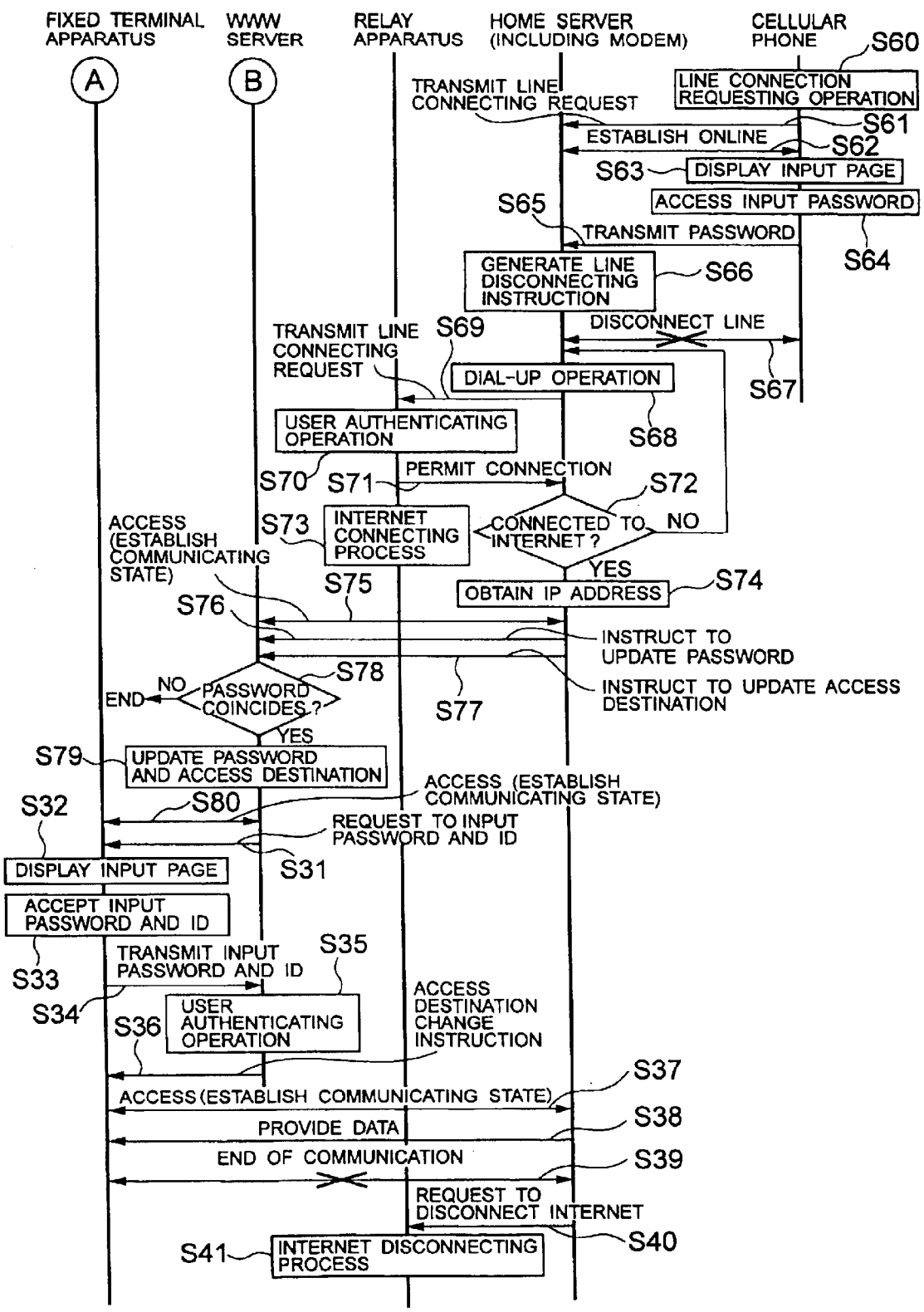
FIG. 5 is a sequence diagram showing the operation of a sequel portion to the sequence diagram of FIG. 4.

Since the operations in step S92 and subsequent steps are substantially the same as those in steps S60 to S80 shown in FIG. 5 and in steps S31 to S41 shown in FIG. 2, their overlapped description is omitted here.

In step S78, the WWW server 5 discriminates whether the password shown by the password data held in step S92 and the password obtained by the updating instruction in step S76 coincide or not.

Although the cellular phone 11 is shown as a mobile terminal apparatus in each of the embodiments, a fixed terminal apparatus having a telephone function can be also used.

Although the home server 1 is connected to the Internet 10 through the relay apparatus 4 by the dial-up connecting method, it can be also connected to the Internet 10 directly or through the router from the LAN.

As mentioned above, according to the invention, a new password is issued in order to access from the first terminal apparatus to the information server. When the first terminal apparatus is notified of the new password, the new password is entered from the second terminal apparatus, or when the second terminal apparatus is notified of the new password, the new password is entered from the first terminal apparatus, and the user authentication is performed by using the input password. A situation, therefore, such that the user other than the specific user accesses from the terminal apparatus to the information server can be certainly excluded by the relatively simple construction. The invention is, particularly, effective in the case where the information server is connected to the network line such as Internet or the like by the dial-up connecting method.

This application is based on Japanese Patent Application No. 2000-272973 which is hereby incorporated by reference.

What is claimed is:

1. A user authentication system having a first terminal apparatus for connecting to an information server through a network line, a second terminal apparatus for connecting to said information server by a communication line independent of said network line, and an authentication server located on said network line, for authenticating a user of said first terminal apparatus when said information server is accessed from said first terminal apparatus through said network line, comprising:

first transmitting means for transmitting a new-issuing request of a password from said second terminal apparatus to said information server through said communication line;

password forming means for forming a new password in said information server in response to the new-issuing request of the password from said first transmitting means;

second transmitting means for transmitting the password formed by said password forming means to said second terminal apparatus through said communication line;

third transmitting means for transmitting the password formed by said password forming means to the authentication server through said network line;

reception notifying means for receiving the password transmitted by said second transmitting means in said second terminal apparatus and notifying the received password;

input means for accepting the password from the user in said first terminal apparatus;

fourth transmitting means for transmitting the password accepted by said input means to said authentication server through said network line; and authenticating means for performing the user authentication in said authentication server in accordance with a coincidence of at least the password transmitted by said third transmitting means and the password transmitted by said fourth transmitting means, wherein said second terminal apparatus is a mobile terminal apparatus having a telephone function, and wherein said communication line is provided with a telephone exchange apparatus for inhibiting a line connection to said information server from a terminal apparatus other than said mobile terminal apparatus to which a predetermined telephone number has been allocated.

2. The system according to claim 1, wherein when the user authentication by said authenticating means is completed, said authentication server guides a destination accessed by said first terminal apparatus to said information server.

3. The system according to claim 1, wherein said authentication server has holding means for receiving the password transmitted by said third transmitting means and holding the received password together with a user identification code which has previously been set and registered.

4. The system according to claim 3, wherein said input means accepts the user identification code together with the password, said fourth transmitting means transmits the password and the user identification code accepted by said input means to said authentication server through said network line, and said authenticating means executes the user authentication by detecting a coincidence of the user identification code held by said holding means and the user identification code transmitted by said fourth transmitting means and a coincidence of the password transmitted by said third transmitting means and the password transmitted by said fourth transmitting means.

5. The system according to claim 1, wherein said information server is a home server which is connected to said network line through a relay apparatus by a dial-up connecting method.

6. The system according to claim 5, wherein said network line is a line of the Internet, and said relay apparatus is an apparatus of an Internet service provider.

7. A user authentication system having a first terminal apparatus for connecting to an information server through a network line, a second terminal apparatus for connecting to said information server by a communication line independent of said network line, and an authentication server located on said network line, for authenticating a user of said first terminal apparatus and when said information server is accessed from said first terminal apparatus through said network line, comprising:

password forming means for forming a new password in said second terminal apparatus and notifying the new password;

first transmitting means for transmitting the password formed by said password forming means to said information server through said communication line;

transmitting and receiving means for receiving the password transmitted from said first transmitting means in said information server and, thereafter, transmitting the received password to said authentication server through said network line;

input means for accepting a password from the user in said first terminal apparatus; second transmitting means for transmitting the password accepted by said input means to said authentication server through said network line; and authenticating means for performing the user authentication in said authentication server in accordance with a coincidence of at least the password transmitted by said transmitting and receiving means and the password transmitted by said second transmitting means, wherein the password forming means forms the new password prior to the user authentications, wherein said second terminal apparatus is a mobile terminal apparatus having a telephone function, and wherein said communication line is provided with a telephone exchange apparatus for inhibiting a line connection to said information server from a terminal apparatus other than said mobile terminal apparatus to which a predetermined telephone number has been allocated.

8. The system according to claim 7, wherein when the user authentication by said authenticating means is completed, said authentication server guides a destination accessed by said first terminal apparatus to said information server.

9. The system according to claim 7, wherein said authentication server has holding means for receiving the password transmitted by said second transmitting means and holding the received password together with a user identification code which has previously been set and registered.

10. The system according to claim 9, wherein said input means accepts the user identification code together with the password, said second transmitting means transmits the password and the user identification code accepted by said input means to said authentication server through said network line, and said authentication means executes the user authentication by detecting a coincidence of the user identification code held by said holding means and the user identification code transmitted by said second transmitting means and a coincidence of the password transmitted by said transmitting/receiving means and the password transmitted by said second transmitting means.

11. The system according to claim 7, wherein said information server is a home server which is connected to said network line through a relay apparatus by a dial-up connecting method.

12. The system according to claim 11, wherein said network line is a line of the Internet, and said relay apparatus is an apparatus of an Internet service provider.

13. A user authentication system having a first terminal apparatus for connecting to an information server through a network line, a second terminal apparatus for connecting to said information server by a communication line independent of said network line, and an authentication server located on said network line, for authenticating a user of said first terminal apparatus when said information server is accessed from said first terminal apparatus through said network line, comprising:

password forming means for forming a new password by said first terminal apparatus and notifying the new password;

first transmitting means for transmitting the password formed by said password forming means to said authentication server through said network line;

input means for accepting a password from the user in said second terminal apparatus;

second transmitting means for transmitting the password accepted by said input means to said information server through said communication line;

transmitting and receiving means for receiving the password transmitted from said first transmitting means in said information server and, thereafter, transmitting the received password to said authentication server through said network line; and authenticating means for performing the user authentication in said authentication server in accordance with a coincidence of at least the password transmitted by said transmitting and receiving means and the password transmitted by said second transmitting means, wherein the password forming means forms the new password prior to the user authentications, wherein said second terminal apparatus is a mobile terminal apparatus having a telephone function, and wherein said communication line is provided with a telephone exchange apparatus for inhibiting a line connection to said information server from a terminal apparatus other than said mobile terminal apparatus to which a predetermined telephone number has been allocated.

14. The system according to claim 13, wherein when the user authentication by said authenticating means is completed, said authentication server guides a destination accessed by said first terminal apparatus to said information server.

15. The system according to claim 13, wherein said authentication server has holding means for holding the password used in the user authentication by said authenticating means together with a user identification code which has previously been set and registered.

16. The system according to claim 15, wherein said first terminal apparatus includes second input means for accepting a previous password, said first transmitting means transmits the previous password accepted by said second input means to said authentication server through said network line, said authentication server includes discriminating means for discriminating a coincidence of at least the password held by said holding means and the previous password transmitted by said first transmitting means, and receives the new password transmitted by said first transmitting means when the coincidence is determined by said discriminating means.

17. The system according to claim 16, wherein said second input means accepts a user identification code together with the previous password, said first transmitting means transmits the previous password and the user identification code accepted by said input means to said authentication server through said network line, and said discriminating means discriminates a coincidence of the user identification code held by said holding means and the user identification code transmitted by said first transmitting means and a coincidence of the password held by said holding means and the previous password transmitted by said first transmitting means.

18. The system according to claim 13, wherein said information server is a home server which is connected to said network line through a relay apparatus by a dial-up connecting method.

19. The system according to claim 18, wherein said network line is a line of the Internet, and said relay apparatus is an apparatus of an Internet service provider.

* * * * *